US000002020H

(19) United States

(12) Statutory Invention Registration (10) Reg. No.: US H2020 H

Kesavan et al. (43) Published: May 7, 2002

(54) TIP AND ADAPTER FOR AN EARTHWORKING BUCKET

(75) Inventors: Arun Kesavan, Peoria; Christopher J. Stickling, Dunlap, both of IL (US)

(73) Assignee: Caterpillar Inc., Peoria, IL (US)

(21) Appl. No.: 09/430,003

(22) Filed: Oct. 29, 1999

(51) Int. Cl.[7] ..... E02F 3/14; E02F 9/28

(52) U.S. Cl. ..... 37/455

(58) Field of Search ..... 37/455, 456, 452, 37/458

(56) References Cited

U.S. PATENT DOCUMENTS

| | | | | | |
|---|---|---|---|---|---|
| 1,330,143 | A | * | 2/1920 | Seal | 37/455 |
| 1,485,434 | A | * | 3/1924 | Seal | 37/455 |
| 1,584,851 | A | * | 5/1926 | Crone | 37/455 |
| 2,256,488 | A | * | 9/1941 | Murtaugh | 37/455 |
| 2,740,212 | A | * | 4/1956 | Werkheiser et al. | 37/455 |
| 3,453,755 | A | * | 7/1969 | Trudeau | 37/456 |
| 3,919,792 | A | * | 11/1975 | Hahn et al. | 37/455 |
| 5,172,501 | A | * | 12/1992 | Pippins | 37/455 |
| 5,561,925 | A | * | 10/1996 | Livesay | 37/452 |
| 5,709,043 | A | * | 1/1998 | Jones et al. | 37/455 |
| 5,765,301 | A | * | 6/1998 | Claendenning | 37/455 |
| 5,806,215 | A | * | 9/1998 | Matthews et al. | 37/452 |
| 5,918,391 | A | * | 7/1999 | Vinas Peya | 37/456 |
| 5,987,787 | A | * | 11/1999 | Mack | 37/456 |
| 6,145,224 | A | * | 11/2000 | Stickling | 37/456 |

* cited by examiner

*Primary Examiner*—Charles T. Jordan
*Assistant Examiner*—M Thomson
(74) *Attorney, Agent, or Firm*—O. Gordon Pence

(57) ABSTRACT

A tip and adapter assembly for an earthworking bucket has a replaceable tip mounted on an adapter. The adapter has a mounting end fitted into a socket cavity of the tip, which are provided with suitable mating surfaces for transferring loading forces from the tip to the adapter. The adapter is provided with an ear that projects into a U-shaped notch in each side of the tip. A gap is provided between the ear and the notch to indicate that excessive wear has not occurred in the tip/adapter interface. However, contact between the ear and notch serves as a visual indicator that excessive wear has occurred. The notch also serves as a fuse to ensure that the tip breaks due to excessive loads before the adapter.

12 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TIP AND ADAPTER FOR AN EARTHWORKING BUCKET

TECHNICAL FIELD

The present invention relates generally to a tip and adapter assembly for an earthworking bucket and the like and, more particularly, to a novel interface between a tip adapter carried on the bucket and a bucket tip.

BACKGROUND ART

Earthworking implements, such as buckets for loaders and excavators commonly employ replaceable tips or teeth that engage the earth being worked or materials being excavated or loaded. Because of the highly abrasive materials encountered, bucket tips wear out rapidly and need to be replaced in order to protect the parent material of the bucket and to keep the bucket working at peak efficiency. Bucket tips are typically mounted on mounting structures referred to as tip adapters and are frequently subjected to high impact and prying forces that must be transferred from the tip into the adapter. To accomplish this, the adapter has a mounting nose that is received into a socket cavity of the tip. However if the forces acting on the tip become so great as to cause either the tip or adapter to break, it is more desirable to have the tip break, rather than the adapter as the adapter is more costly and more time consuming to replace.

The forces and impact loads on the tip also cause wear between the mating surfaces between the socket cavity of the tip and the mounting nose of the adapter. Therefore, its also desirable to provide a tip/adapter interface with adequate load carrying surfaces to minimize such wear and to extend the usable life of both the tip and adapter as a result of such wear.

While it is desirable to minimize such wear on the adapter, it cannot be completely eliminated. In addition, such wear is not readily apparent as the adapter nose is hidden from view due to being encased within the socket cavity of the tip. If too much wear occurs on the interface surfaces, the tip becomes exceedingly loose and wear between the tip and adapter interface surfaces accelerates and frequently results in premature tip failure or the loss of the tip from the adapter. Consequently, is also advantageous to be able to visually determine when the contacting interface surfaces of the adapter become worn to a point that replacement of the adapter is desirable to prevent the premature failure of the tip or its loss.

Because tips are quite frequently replaced due to rapid external wear, it is desirable to be able to quickly and easily remove the worn tip and replace it with a new one. Many types of retention devices, such as pins and the like, have been used in the past to retain the tip onto the adapter. Some typical examples of retention devices used for retaining bucket teeth are disclosed in U.S. Pat. No. 5,068,986 issued Dec. 3, 1991 to Larren F. Jones for Excavating Tooth Point Particularly Suited for Large Dragline Buckets; U.S. Pat. No. 5,272,824 issued Dec. 28, 1993 to Erwin D. Cornelius for Tooth Assembly with Leaf Spring Retainer; and U.S. Pat. No. 5,423,138 issued Jun. 13, 1995 to Richard E. Livesay, et al for Tip to Adapter Interface.

Many such prior retention devices perform satisfactorily, but are either complex and expensive, or require special tools or the large exertion of effort to remove and replace the retainers. Other retainers may simply fail during use do the high loads exerted on such retainers during use, resulting in the loss of the tool from the implement. It is therefore highly advantageous to use a hammerless type of retainer. One such hammerless retainer is the compression spring retainer disclosed in U.S. Pat. No. 5,937,549, issued May 19, 1997 to John L. Bender et al and assigned to the assignee hereof.

The present invention is directed to overcoming one or more of the problems encountered in the use of prior art tools and retention devices.

DISCLOSURE OF THE INVENTION

In accordance with one aspect of the present invention, a tip and adapter assembly is provided for an earthworking bucket that includes an elongated adapter and a replaceable tip. The adapter has a rear mounting portion adapted for mounting the adapter to the bucket and a front tip mounting nose for receiving a bucket tip. The tip mounting nose has a top surface, a bottom surface and a pair of side surfaces, each of the top and bottom surfaces having a longitudinally extending, centrally disposed rib protruding therefrom. Each of the side surfaces have a centrally located ear protruding therefrom. The replaceable tip has an elongated body disposed along a longitudinal axis and tapering from a wide rearward mounting end portion to a narrow forward ground engaging end portion. The mounting end portion has a rearwardly opening socket cavity for receiving the front tip mounting nose of the adapter. The socket cavity has pair of side walls, a top wall and a bottom wall. The top and bottom walls each have a central, longitudinally disposed recessed groove therein for receiving a respective one of the ribs of the adapter. Each of the side walls has a notch therethrough adapted to receive a respective one of the ears of the adapter.

In another aspect of the present invention, a replaceable bucket tip is adapted to be detachably mounted to a mounting nose of a bucket adapter by means of a retainer. The replaceable bucket tip includes an elongated body disposed along a longitudinal axis and tapering from a wide rearward mounting end portion to a narrow forward ground engaging end portion. The mounting end portion has a rearwardly opening socket cavity having a rectangularly shaped open end. The cavity is defined by pair of side walls, a top wall and a bottom wall. Each of the top and bottom walls have a central, longitudinally disposed recessed groove therein, and each of the side walls are generally parallel to each other and each have a notch extending forward from the open end toward the ground engaging end. The notch has a length sufficient to weaken the tip so as act as a fuse whereby before a vertical force acting upon the ground engaging end portion of the tip that would be sufficient to cause the breaking of the adapter on which the tip is mounted will result in the breakage of the tip first.

BEST MODE FOR CARRYING OUT THE INVENTION

Figure 1:
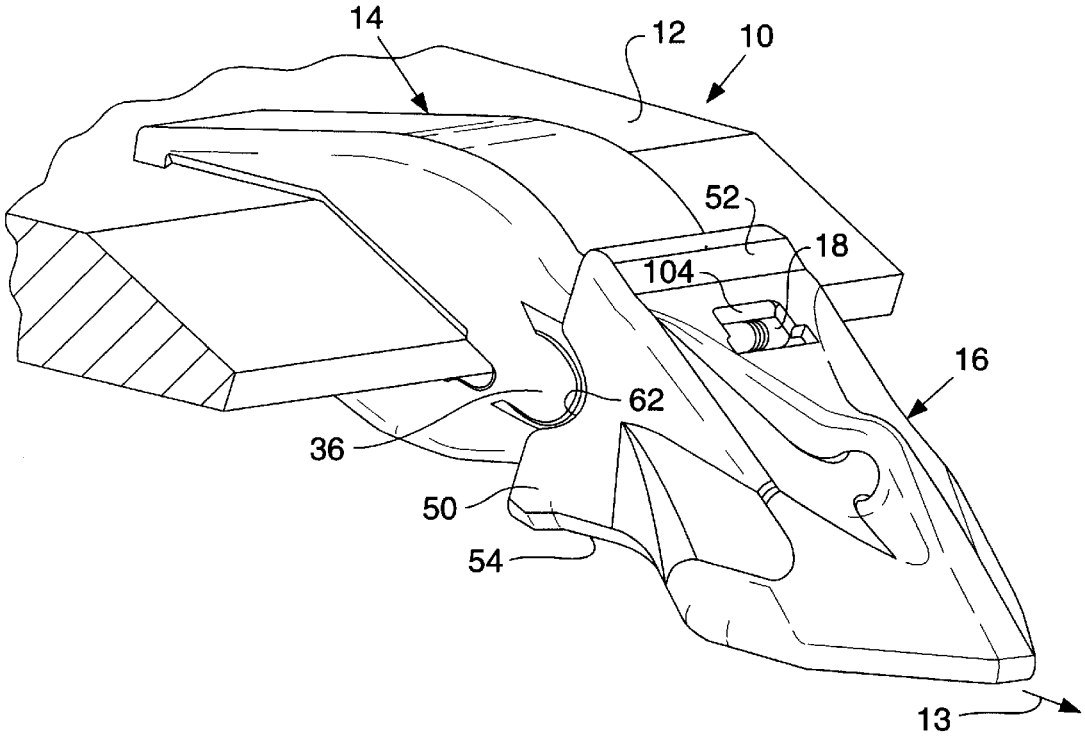
FIG. 1 is a perspective view of a bucket tip and adapter assembly embodying the principles of the present invention.
Figure 2:
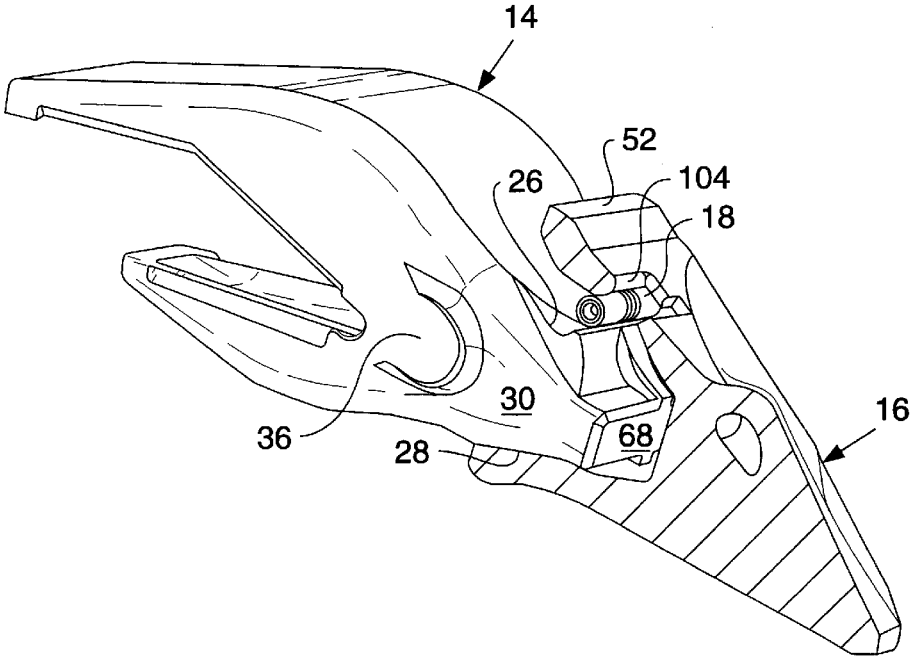
FIG. 2 is a perspective view similar to FIG. 1, but with the tip shown in section.

Referring to the drawings, one exemplary embodiment of the present invention is disclosed in FIGS. 1 and 2 where a bucket tip and adapter assembly is shown at 10 for an earthworking bucket (not shown).

Earthworking implements, such as an excavator/loader/dragline bucket, are adapted to normally engage the ground in a primary direction of travel. In other words, they are manipulated to dig or scoop material in a particular direction by the earthworking machine and/or the operator of such machine. In the present case, the primary direction of travel is typically parallel to and in a direction away from a cutting edge 12 of the bucket, as designated by arrow 13 in FIG. 1.

The tip and adapter assembly 10 includes an adapter 14, a bucket tip 16 and an elongate retainer 18 for detachably retaining the tip 16 onto the adapter 14.

Figure 3:
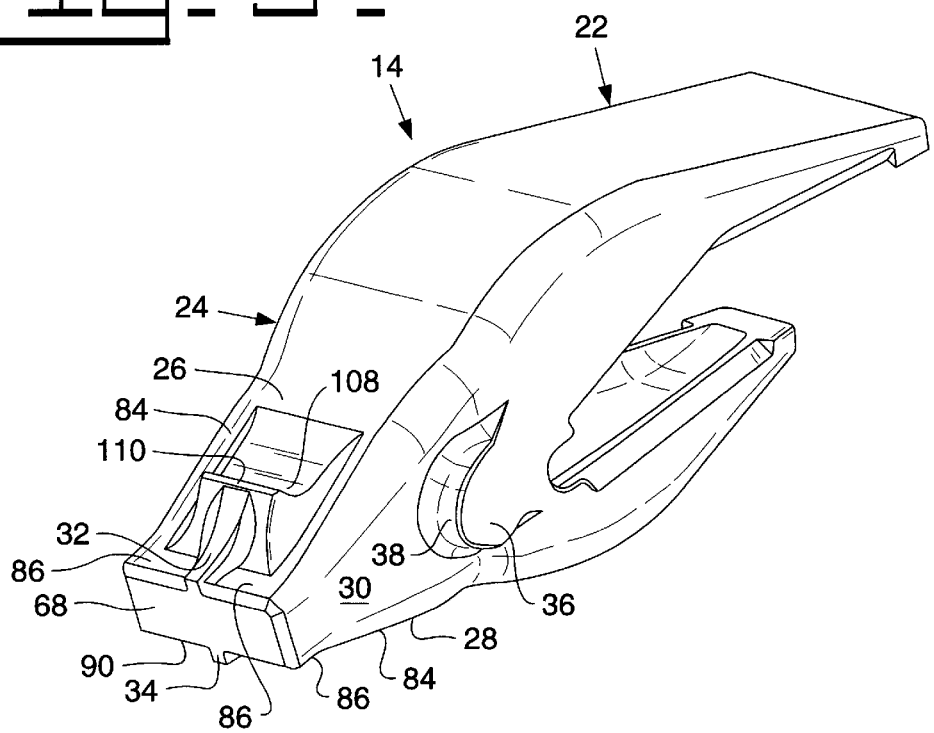
FIG. 3 is a reverse perspective view of the adapter shown in FIG. 1 by itself.

The adapter 14 has a rear mounting portion 22 adapted for mounting the adapter to the bucket cutting edge 12 and a front tip mounting nose 24 for receiving the bucket tip 16. As shown in FIG. 3, the tip mounting nose 24 has a top surface 26, a bottom surface 28 and a pair of side surfaces (one of which is shown at 30), each of the top and bottom surfaces 26, 28 have one of a pair of longitudinally extending, centrally disposed ribs 32, 34 protruding therefrom. Each of the side surfaces 30 have a centrally located ear 36 protruding therefrom, with each ear 36 having a rounded forwardly facing end 38.

Figure 4:
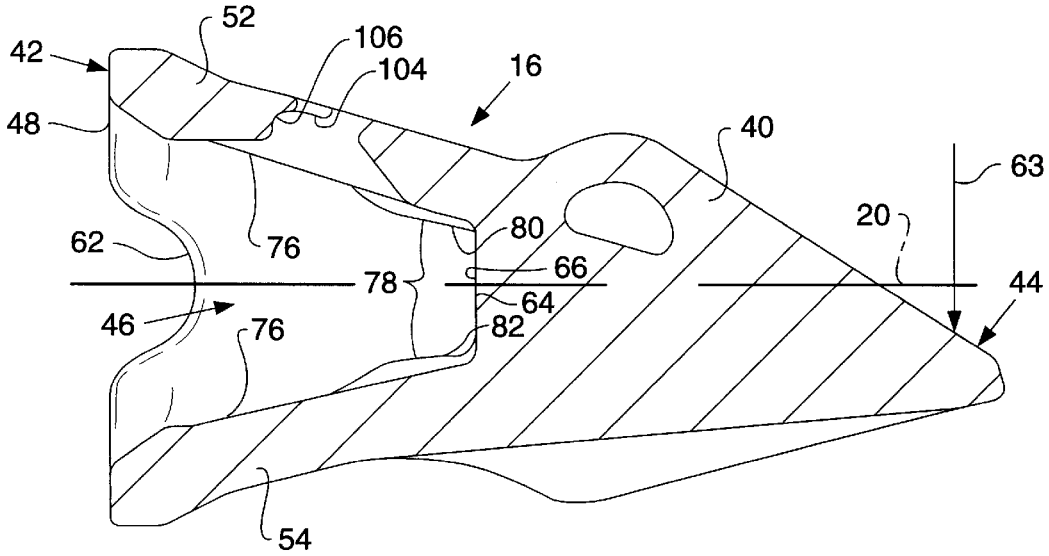
FIG. 4 is a side sectional view of the tip shown in FIG. 1.
Figure 5:
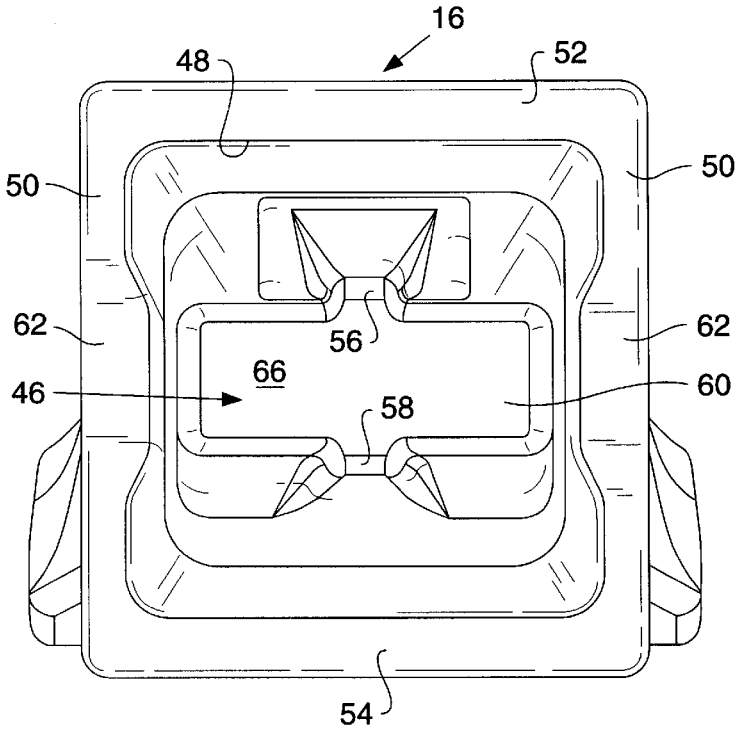
FIG. 5 is a rear end view of the tip illustrated in FIG. 1.

As best seen in FIG. 4, the replaceable tip 16 of the tip and adapter assembly 10 has an elongated body 40 disposed along a longitudinal axis 20 and tapers from a wide rearward mounting end portion 42 to a narrow forward ground engaging end portion 44. The mounting end portion 42 has a rearwardly opening socket cavity 46 for receiving the front tip mounting nose 24 of the adapter 14. As seen in FIG. 5, the socket cavity 46 has a rectangularly shaped open end 48, a pair of side walls 50, a top wall 52 and a bottom wall 54, the top and bottom walls 52, 54 each having one of a pair of central, longitudinally disposed recessed grooves 56, 58 therein for receiving a respective one of the ribs 32, 34 of the adapter 14. Each of the side walls 50 are generally parallel to each other and have a generally U-shaped notch 62 therethrough adapted to receive a respective one of the ears 36 of the adapter 14.

The notches 62 extend forward from the open end 48 toward the ground engaging end portion 44 of the tip 16. Each notch 62 is provided with a length sufficient to weaken the tip so as act as a fuse whereby before a vertical force acting in the direction of arrow 63 upon the ground engaging end portion 44 of the tip 16 that would be sufficient to cause the breaking of the adapter 14 on which the tip 16 is mounted will result in the breakage of the tip 16 first.

The socket cavity 46 has an end wall 64 that defines a planar force transmitting surface 66 oriented perpendicular to the longitudinal axis 20 and facing in a direction opposite to the direction of travel 13. The tip mounting nose 24 of the adapter has a planar front end surface 68 (FIG. 3) disposed in abutting contact with the planar surface 66 of the cavity 46 when the tip 16 is mounted on the adapter 14, whereby longitudinally oriented forces on the tip 16 in a direction opposite to the direction of travel 13 are transmitted into the adapter 14 through the abutting planar end surfaces 66, 68 of the tip 16 and adapter 14.

Figure 6:
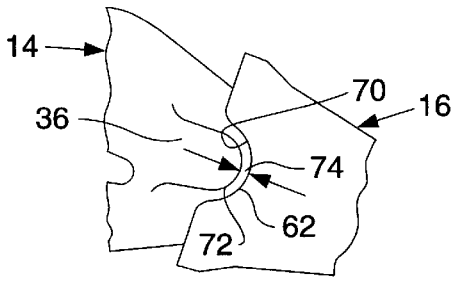
FIG. 6 is a fragmentary side elevational view of a portion of the tip and adapter assembly of FIG. 1 illustrating an ear and notch thereof.

As shown in FIG. 6, each of the notches 62 have an interior peripheral surface 70 and each of the ears 36 have an exterior peripheral surface 72. The ears 36 are configured so as to create a predetermined clearance gap 74 between its exterior peripheral surface 72 and the corresponding interior surface 70 of its respective notch 62 during use until an predetermined amount of wear has occurred on the abutting end surface 68 of the adapter 14, whereby contact between the peripheral surfaces 70, 72 of the ears 36 and notches 62 provides a visual indicator that the adapter 14 needs replacing due to an excessive amount of wear on the abutting end surface 68 thereof.

The top and bottom walls 52, 54 of the socket cavity 46 each have a first portion 76 and a second stepped down forward end portion 78 (FIG. 4). The first portions 76 generally taper toward each other from the open end 48 toward the end wall 64. The second stepped down forward end portions 78 are disposed adjacent the end wall 64 and define a pair of spaced apart and generally parallel end surfaces 80, 82. As best shown in FIG. 3, the top and bottom surfaces 26, 28 of the adapter 14 each have a first portion 84 disposed in a mating relationship with a respective one of the first portions 76 of top and bottom walls 52, 54 of the socket cavity 46 and a second portion 86 transitioning from the first portion 84 to a generally flat orientation disposed in a mating relationship with the end surfaces 80, 82 of second stepped down end portions 78 so as to define a pair of load bearing surfaces 88, 90 disposed in abutting contact with the end surfaces 80, 82 respective of the socket cavity, through which vertical loads on the tip 16 are transferred into the adapter 14.

Figure 7:
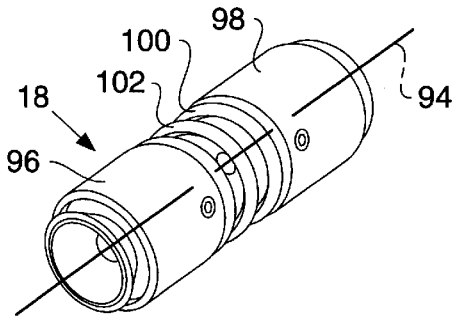
FIG. 7 is an enlarged perspective view of a retainer for retaining the tip to the adapter of FIG. 1.

As mentioned earlier, the compression retainer 18 is used to detachably retain tip 16 onto adapter 14. The elongate retainer 18 is compressible in a longitudinal direction, but substantially non-compressible in a transverse direction. As shown in FIG. 7, retainer 18 is disposed along a longitudinal axis 94 and has a pair of solid steel opposite end portions 96, 98 and a compressible middle portion 100. Each of the end portions 96,98 have a circular cross-section with centers coincident to the longitudinal axis 94 and are capable of carrying, in compression, a high load oriented radially to the end portions 96,98. The compressible middle portion 100 is disposed between the opposite end portions 96,98 and includes a coil compression spring 102 whereby the retainer 18 is provided with a predetermined free length along its longitudinal axis 94 when the spring 102 is in a noncompressed state and a shorter compressed length when the spring 102 is in a compressed state.

As shown in FIGS. 1 and 2, one of the top and bottom walls 52,54 of the socket cavity 46 has an elongate retainer opening 104 adapted for receiving the elongate retainer 18. Retainer opening 104 is oriented in a direction transverse to the longitudinal axis 20 of the tip 16. Preferably, the retainer opening 104 is provided in the top wall 52 as shown in FIGS. 1 & 2. The retainer opening 104 defines a transversely extending, forwardly facing first abutment surface 106 (FIG. 4) along the rearward side thereof adapted for engagement with the retainer 22. The adapter 14 is provided with a retainer pocket 108 on its top and through the upper rib 32. As best shown in FIG. 3, the retainer pocket 108 is disposed in alignment with the retainer opening 104 when the tip 16 is mounted onto the adapter 14 and provides a second abutment surface 110 disposed in a generally spaced, diametrically opposing relationship to the first abutment surface 106 in the tip 16.

It should be noted at this point that the retainer opening 104 in the tip 16 is provided with a predetermined length that is less than the free length but greater than the compressed length of the retainer 18 in order to permit the insertion of the retainer 18 through the opening 104 when in the compressed state but to prevent the escape of the retainer 18 therethrough when in the noncompressed state.

INDUSTRIAL APPLICABILITY

The tip and adapter assembly 10 constructed in accordance with the present invention affords many advantages of prior devices. For instance, excessive loads can be exerted on the tip 16 when it is used to pry out large rocks or boulders from the earth. Such forces can break either the tip or adapter 14. As the adapter is more costly and takes longer to replace in view of being welded to the bucket cutting edge 12, it is much more desirable to have the tip 16 break, rather than the adapter 14. The construction of the tip 16 with the longitudinally extending notches 62 in the side walls 50 of the socket cavity 46 ensures that the tip 16 will break first before the adapter 14 by significantly, but controllably, weakening the tip against vertical loads, i.e., loads normal to the direction of travel 13. Such notches 62 also serve a second purpose in conjunction with the ears 36 on the side surfaces 30 of the adapter 14. Such purpose is to provide a visual indicator of wear on the end surface 68 of the nose 24 of the adapter 14. This visual indicator is provided by the disappearance of the gap 74 when the interior peripheral surface 70 of the notch 62 comes into contact with the exterior peripheral surface 72 of the ears 36. The disappearance of the gap 74 is gauged to occur when a certain amount of wear occurs on the end surface 68 through abutting contact with end surface 66. This certain amount of wear correlates with the desired time to replace the adapter 14 so as to prevent excessive looseness of the tip on the adapter that would otherwise result in accelerated wear and damage to the tip 16 and even failure or loss of the tip.

The combination of the ribs 32,34 and grooves 56,58 provide additional load bearing surfaces for transferring torsional loads on the tip 16 into the adapter 14. The grooves 56,58 also provide a second purpose by serving as visual wear indicators for the tip 16 by creating a hole when sufficient material has been worn away on the top and/or bottom walls 52,54 so as to wear through to the grooves.

The present retainer 18 is easily installed onto and removed from the retainer opening 104 of the tip 16 without the use of special tools and without the exertion of a large amount of effort so as to make tip replacement quick and easy. To install, the retainer 18 is compressed to its compressed length so as to pass through the retainer opening 104. This may be accomplished by placing the retainer 18 in the retainer opening 104 and tapping down with a hammer to compress the compressible middle portion 100 of the retainer so as to insert the retainer into retainer pocket 108. Once in the pocket 108, the retainer 18 will re-expand to its longer noncompressed length so as to prevent its escape from the pocket through the retainer opening. Once in the pocket, the solid end portions 96,98 are adapted to abut the first and second abutment surfaces 106,110, respectively to prevent the tip from coming off the adapter in the primary direction of travel 24.

Other aspects and advantages of the present invention of this invention can be obtained through a study of the drawings, the disclosure and the appended claims.

What is claimed is:

1. A tip and adapter assembly for an earthworking bucket, comprising:

an elongated adapter having a rear mounting portion adapted for mounting the adapter to said bucket and a front tip mounting nose for receiving a bucket tip, said tip mounting nose having a top surface, a bottom surface and a pair of side surfaces, each of said top and bottom surfaces having a longitudinally extending, centrally disposed rib protruding therefrom, and each of said side surfaces having a centrally located ear protruding therefrom; and a replaceable tip having an elongated body disposed along a longitudinal axis and tapering from a wide rearward mounting end portion to a narrow forward ground engaging end portion, said mounting end portion having a rearwardly opening socket cavity for receiving the front tip mounting nose of said adapter, said socket cavity having pair of side walls, a top wall and a bottom wall, said top and bottom walls each having a central, longitudinally disposed recessed groove therein for receiving a respective one of said ribs of said adapter, and each of said side walls having a notch therethrough adapted to receive a respective one of said ears of said adapter.

2. The tip and adapter assembly of claim 1 wherein said socket cavity has an open end and wherein each of said notches are generally U-shaped and extend forward from said open end toward said ground engaging end portion of the tip, each notch having a length sufficient to weaken said tip so as act as a fuse whereby before a vertical force acting upon the ground engaging end portion of the tip that would be sufficient to cause the breaking of said adapter on which said tip is mounted will result in the breakage of the tip first.

3. The tip and adapter assembly of claim 2 wherein said cavity has an end wall defining a planar force transmitting surface oriented perpendicular to said longitudinal axis and said tip mounting nose of said adapter has a planar front end surface disposed in abutting contact with said planar surface of said cavity when said tip is mounted on said adapter, whereby longitudinally oriented forces on said tip are transmitted into said adapter through said abutting planar end surfaces of said tip and adapter.

4. The tip and adapter assembly of claim 3 wherein each of said notches has an interior peripheral surface and each of said ears has an exterior peripheral surface, said ears being configured so as to create a gap between its exterior peripheral surface and the corresponding interior surface of its respective notch during use until an predetermined amount of wear has occurred on the abutting surface of the adapter, whereby contact between the peripheral surfaces of the ears and notches provides a visual indicator that the adapter needs replacing due to an excessive amount of wear on said abutting surface thereof.

5. The tip and adapter assembly of claim 4 wherein said top and bottom walls of the socket cavity each have a first portion, said first portions generally tapering toward each other from said open end toward said end wall and a second stepped down forward end portion adjacent said end wall defining a pair of spaced apart and generally parallel end surfaces, and said top and bottom of said adapter each having a first portion disposed in a mating relationship with a respective one of said first portions of top and bottom walls of the socket cavity and a second portion transitioning from said first portion to a generally flat orientation disposed in a mating relationship with said end surfaces of second stepped down end portion so as to define a pair of load bearing surfaces disposed in abutting contact with said end surfaces of the socket cavity, through which vertical loads on said tip are transferred into said adapter.

6. The tip and adapter assembly of claim 1 including an elongate retainer for detachably retaining said tip on said adapter, said retainer being compressible in a longitudinal direction, but substantially non-compressible in a transverse direction.

7. The tip and adapter assembly of claim 6 wherein one of said top and bottom walls of the socket cavity has an elongate retainer opening adapted for receiving said retainer in a direction transverse to said longitudinal axis, said retainer opening defining a transversely extending, forwardly facing abutment surface along a rearward side thereof adapted for engagement with said retainer.

8. The tip and adapter assembly of claim 7 wherein said retainer is a compression spring retainer having a pair of solid steel end portions and a compressible middle portion.

9. A replaceable bucket tip adapted to be detachably mounted to a mounting nose of a bucket adapter by means of a retainer, said replaceable bucket tip comprising:

an elongated body disposed along a longitudinal axis and tapering from a wide rearward mounting end portion to a narrow forward ground engaging end portion, said mounting end portion having a rearwardly opening socket cavity having a rectangularly shaped open end, said cavity being defined by pair of side walls, a top wall and a bottom wall, each of said top and bottom walls having a central, longitudinally disposed recessed groove therein, and each of said side walls being generally parallel to each other and each having a generally U-shaped notch extending forward from said open end toward said ground engaging end, said notch having a length sufficient to weaken said tip so as act as a fuse whereby before a vertical force acting upon the ground engaging end portion of the tip that would be sufficient to cause the breaking of said adapter on which said tip is mounted will result in the breakage of the tip first.

10. The replaceable bucket tip of claim 9 wherein said socket cavity includes an end wall defining a planar force transmitting surface oriented perpendicular to said longitudinal axis.

11. The replaceable bucket tip of claim 9 wherein said top and bottom walls each having a first portion generally tapering toward each other from said open end toward said end wall and a second stepped down forward end portion adjacent said end wall defining a pair of spaced apart and generally parallel end surfaces.

12. The replaceable bucket tip of claim 10 wherein one of said top and bottom walls includes an elongate retainer opening therethrough, said retainer opening having a transversely extending, forwardly facing side with an arcuately shaped abutment surface thereon adapted for engagement with said retainer.

* * * * *